(12) United States Patent
McDonald et al.

(10) Patent No.: US 11,745,479 B2
(45) Date of Patent: Sep. 5, 2023

(54) LAMINATED WOOD POLYMER COMPOSITE ARTICLE AND METHOD OF MAKING A LAMINATED WOOD POLYMER COMPOSITE ARTICLE

(71) Applicant: TREX COMPANY, INC., Winchester, VA (US)

(72) Inventors: Jason Patrick McDonald, Martinsburg, WV (US); Darren W. Garrison, Capon Bridge, WV (US)

(73) Assignee: TREX COMPANY, INC., Winchester, VA (US)

( * ) Notice: Subject to any disclaimer, the term of this patent is extended or adjusted under 35 U.S.C. 154(b) by 162 days.

(21) Appl. No.: 17/021,167

(22) Filed: Sep. 15, 2020

(65) Prior Publication Data
US 2020/0406594 A1    Dec. 31, 2020

Related U.S. Application Data

(62) Division of application No. 15/839,198, filed on Dec. 12, 2017, now Pat. No. 10,773,500.

(Continued)

(51) Int. Cl.
*B32B 27/12* (2006.01)
*B32B 21/02* (2006.01)
(Continued)

(52) U.S. Cl.
CPC ............... *B32B 27/12* (2013.01); *B32B 7/12* (2013.01); *B32B 21/02* (2013.01); *B32B 27/30* (2013.01);
(Continued)

(58) Field of Classification Search
CPC ..... B32B 15/043; B32B 15/08; B32B 15/082; B32B 15/085; B32B 15/10; B32B 15/12; B32B 15/14; B32B 21/02; B32B 21/06; B32B 21/08; B32B 21/10; B32B 21/13; B32B 2255/10; B32B 2255/12; B32B 2255/26; B32B 2255/28; B32B 2260/021; B32B 2260/046; B32B 2262/062; B32B 2262/065; B32B 2262/067; B32B 2264/067; B32B 2264/101; B32B 2264/102; B32B 2264/107; B32B 2270/00; B32B 2272/00; B32B 2307/408; B32B 2307/41; B32B 2307/554; B32B 2307/584; B32B 2307/704; B32B 2307/71; B32B 2307/732; B32B 2307/744; B32B 2375/00; B32B 2419/00; B32B 2419/06;
(Continued)

(56) References Cited

U.S. PATENT DOCUMENTS 3,264,272 A    8/1966    Rees
3,404,134 A    10/1968   Rees
(Continued)

*Primary Examiner* — Frances Tischler
(74) *Attorney, Agent, or Firm* — McNees Wallace & Nurick LLC

(57) ABSTRACT

A laminated composite article having a core component and laminate sheet. The laminate sheet is disposed and overlying at least a portion of the core component. The laminate sheet includes a wear layer and an ink layer. The laminate sheet includes UV absorbers. The UV absorbers are arranged and disposed to provide ink stability to the ink layer. Methods for forming the laminated composite article are also disclosed.

17 Claims, 11 Drawing Sheets

Related U.S. Application Data

(60) Provisional application No. 62/432,857, filed on Dec. 12, 2016.

(51) Int. Cl.

| | |
|---|---|
| *B32B 37/06* | (2006.01) |
| *B32B 27/30* | (2006.01) |
| *B32B 27/32* | (2006.01) |
| *B32B 7/12* | (2006.01) |
| *B32B 27/40* | (2006.01) |
| *B32B 38/00* | (2006.01) |
| *C08J 5/04* | (2006.01) |
| *B32B 37/15* | (2006.01) |
| *B32B 37/12* | (2006.01) |

(52) U.S. Cl.
CPC ............ *B32B 27/304* (2013.01); *B32B 27/32* (2013.01); *B32B 27/40* (2013.01); *B32B 37/06* (2013.01); *B32B 38/145* (2013.01); *B32B 37/12* (2013.01); *B32B 37/153* (2013.01); *B32B 2260/021* (2013.01); *B32B 2260/046* (2013.01); *B32B 2262/067* (2013.01); *B32B 2307/554* (2013.01); *B32B 2307/584* (2013.01); *B32B 2375/00* (2013.01); *C08J 5/045* (2013.01)

(58) Field of Classification Search
CPC . B32B 2451/00; B32B 2479/00; B32B 27/08; B32B 27/10; B32B 27/12; B32B 27/16; B32B 27/20; B32B 27/22; B32B 27/30; B32B 27/302; B32B 27/304; B32B 27/306; B32B 27/308; B32B 27/32; B32B 27/327; B32B 27/36; B32B 27/40; B32B 29/005; B32B 29/02; B32B 3/02; B32B 37/06; B32B 37/12; B32B 37/153; B32B 38/145; B32B 5/26; B32B 7/023; B32B 7/04; B32B 7/12; B32B 9/041; B32B 9/042; B32B 9/045; B32B 9/047; B32B 9/06; C08J 5/045
See application file for complete search history.

(56) References Cited

U.S. PATENT DOCUMENTS

| | | | |
|---|---|---|---|
| 3,836,412 | A | 9/1974 | Boustany et al. |
| 4,228,116 | A | 10/1980 | Colombo et al. |
| 4,248,743 | A | 2/1981 | Goettler |
| 4,376,144 | A | 3/1983 | Goettler |
| 4,792,020 | A | 12/1988 | Okumura et al. |
| 2005/0194585 | A1 | 9/2005 | Tezuka et al. |
| 2006/0147693 | A1 | 7/2006 | Przybylinski et al. |
| 2008/0128933 | A1 | 6/2008 | Przybylinski et al. |
| 2010/0021753 | A1 | 1/2010 | Hojabr et al. |
| 2015/0321452 | A1* | 11/2015 | Egashira ................ B29C 48/15 428/354 |

* cited by examiner

LAMINATED WOOD POLYMER COMPOSITE ARTICLE AND METHOD OF MAKING A LAMINATED WOOD POLYMER COMPOSITE ARTICLE

CROSS-REFERENCE TO RELATED APPLICATIONS

This application is a divisional of U.S. Utility application Ser. No. 15/839,198, filed on Dec. 12, 2017, and entitled "LAMINATED WOOD POLYMER COMPOSITE ARTICLE AND METHOD OF MAKING A LAMINATED WOOD POLYMER COMPOSITE ARTICLE", the disclosure of which is hereby incorporated by reference in its entirety.

FIELD OF THE INVENTION

This invention relates to a laminated wood polymer composite article comprising a laminated sheet on a core component, the laminated sheet having a wear layer and an ink layer system providing ink stability and wear resistance.

BACKGROUND OF THE INVENTION

With the rising cost of wood and the shortage of mature trees, it is desirable to find substitutes for wood. A growing market has emerged for the use of wood polymer composites (WPCs) to replace traditional wood products, including pressure-treated lumber in applications such as decking, window casing, fencing, automobile interiors and pallets. WPCs typically consist of mixtures of thermoplastic materials with cellulose, such as wood particles in the form of sawdust. WPCs may be used in many of the same applications as an all-wood product but offer advantages of providing flame resistance, as well as enhanced resistance to rot, resistance to attack by insects, and resistance to deterioration due to the effects of moisture and sunlight. WPCs may have the same workability as wood, may be splinter-free, and may be capable of being colored in bulk as opposed to wood, which typically can only be surface stained or painted. The encapsulation of cellulosic fibers in a polymeric matrix is known, having previously been disclosed, for example, in U.S. Pat. Nos. 3,836,412; 4,228,116; 4,248,743; 4,376,144; and 4,792,020, each of which are incorporated by reference in their entirety.

In general, consumers prefer WPC over pressure-treated lumber and want products having extended lifetimes (for example, at least for 25 years) with minimal maintenance.

Current WPC products offer significant advantages over pressure-treated lumber for maintenance over the life of the product. However, WPC products are subject to the same environmental factors, including staining, scuffing, scratching, marring and fading, as pressure treated lumber, so it is desirable to limit the susceptibility of the WPC to those factors. Most of these issues relate to the surface of the WPC and not the bulk of the material.

It is desirable to provide additional wear resistance and ink stability to WPCs. There have been attempts to modify the surface of WPCs, such as the use of surface or cap layers over a bulk or core WPC layer. Previous surface layers include an acrylonitrile-styrene-acrylate surface or cap layer (see U.S. Patent Application Publications 2006/0147693 and 2008/0128933, each of which are incorporated by reference in their entirety) and use of a coating applied on the surface of the WPC (e.g. special paint). U.S. Patent Application Publication 2005/194585, which is incorporated by reference in its entirety, describes wood articles made from wood substrates (i.e. natural wood, pressure treated wood, or laminated wood) and ionomers cross head extruded onto the wood substrate. When a coating has been used, the surface of the WPC frequently requires pretreatment to allow the application of the coating layer.

One attempt at providing additional wear resistance includes Zuri Decking by Royal Building Products. Zuri decking has a printed woodgrain image between a PVC core and clear PMMA wear layer. The article formed by the Zuri process undesirably is prone to stain/whiten when exposed to plasticizers commonly found in PVC floor mats, garden hoses, etc.

Other systems providing coated systems include interior laminate flooring. These types of floors will have woodgrain images typically printed on paper or PVC films with coatings applied for wear and scratch resistant properties. These coatings applied to indoor flooring suffer from the drawback that they degrade in exterior applications and are not capable of providing fade resistance to meet industry acceptable lifetimes.

Wood polymer composite systems that provide enhanced wear resistance and ink stability are desirable in the art.

BRIEF DESCRIPTION OF THE INVENTION

In an exemplary embodiment, a laminated composite article having a core component and laminate sheet is disclosed. The laminate sheet is disposed and overlying at least a portion of the core component. The laminate sheet includes a wear layer and an ink layer. The laminate sheet includes UV absorbers. The UV absorbers are arranged and disposed to provide ink stability to the ink layer.

In another exemplary embodiment, a process of forming a laminated wood composite article is disclosed. The process includes providing a core component. A printable film is formed. A first surface of the printable film is printed with an ink layer. The process further includes forming a wear layer having UV absorbers. The wear layer is applied to the ink layer to form a laminate sheet. The process further includes applying the laminate sheet to the core component. The UV absorbers are arranged and disposed to provide ink stability to the ink layer.

In another exemplary embodiment, a process of forming a laminated wood composite article is disclosed. The process includes providing a core component. The process includes forming a wear layer having UV absorbers. A second surface of the wear layer is printed with an ink layer to form a laminate sheet. The process further includes applying an adhesive to a second surface of the printable film and applying the laminate sheet to the core component. The UV absorbers are arranged and disposed to provide ink stability to the ink layer.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are processes for forming a laminated wood polymer composite article. Embodiments of the present disclosure, in comparison to processes not utilizing one or more features disclosed herein, provide a durable surface capable of being exposed to outdoor conditions, resistant to delamination, having a desirable aesthetic look, having a color and/or pattern that retains the desirable aesthetic look for extended periods of time in outdoor conditions, provide slip, scratch and mar resistant wear surface, or a combination thereof.

Unless stated otherwise, all percentages, parts, ratios, etc., are by weight. Further, when an amount, concentration, or other value or parameter is given as either a range or a list of upper values and lower values, this is to be understood as specifically disclosing all ranges formed from any pair of any upper range limit or preferred value and any lower range limit or preferred value, regardless of whether ranges are separately disclosed. It is not intended that the scope of the invention be limited to the specific values recited when defining a range. When a component is listed as an optional component in a composition or copolymer, it may not be present (it comprises 0%) or it may be present in a non-zero amount (such as at least 0.1%).

Figure 1:
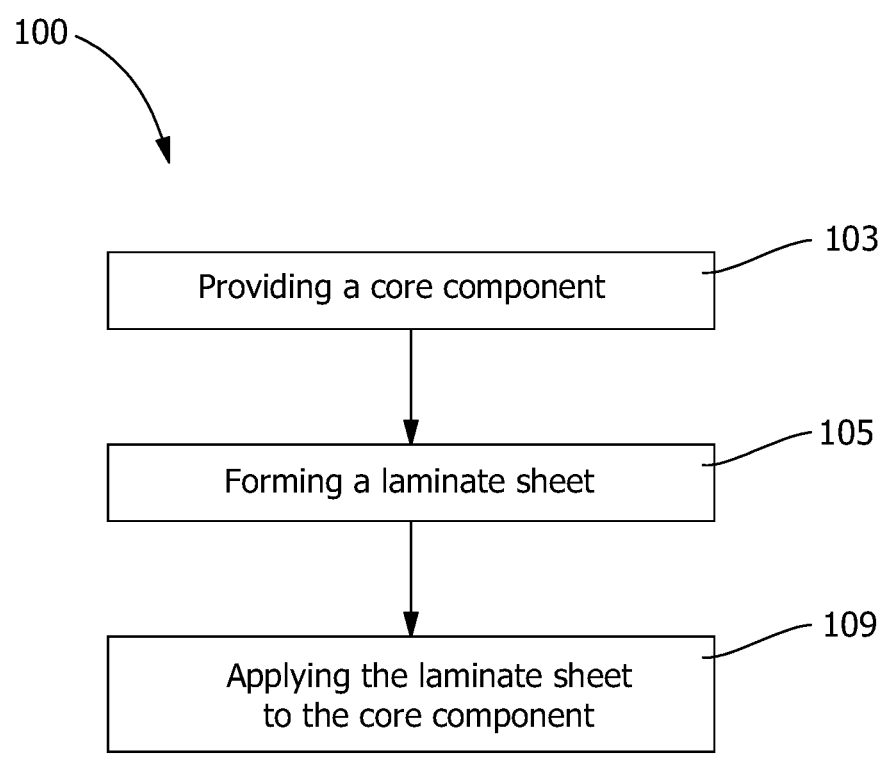
FIG. 1 shows a process for forming a laminated wood polymer composite article, according to an embodiment of the present disclosure.

As shown in FIG. 1, a process, according to an embodiment of the present disclosure, includes a process 100 for forming a laminated composite article. The process includes providing a core component 301 (step 103) comprising a substrate. Suitable substrates for use as the core component 301 include, but are not limited to, wood, metal, polymer, ceramic, wood polymer composites, and combinations thereof. One particularly suitable substrate for use as the core component 301 is a wood polymer composite (WPC) comprising a blend of cellulosic material and a thermoplastic polymeric resin, such as WPC deck boards available from TREX Company. In one embodiment, the core component 301 may comprise one or more thermoplastic polymers, such as, for example, polyolefins, such as high-density polyethylene (HDPE), low density polyethylene (LDPE), linear low-density polyethylene (LLDPE), ultrahigh molecular weight polyethylene (UHMWPE), ultra-low-density polyethylene (ULDPE), copolymers of ethylene and a second α-olefin monomer including metallocene polyethylene (MPE), ethylene/propylene copolymers, terpolymers, such as ethylene propylene diene monomer (EPDM), and polypropylene homo- and copolymers. Such thermoplastic polymers may also include polymers and copolymers, such as polyvinyl chloride, polyvinyl chloride vinyl acetate copolymers, polyvinyl chloride n-butyl acrylate copolymers, chlorinated polyvinyl chloride, and polystyrene. The thermoplastic polymers may be present in the core component 301 alone or in combination with cellulosic material, when present in the wood polymer composite. Suitable sources of the thermoplastic polymer may include, but are not limited to, recycled polymer waste streams. For example, waste streams from post-consumer polymer processing waste. The thermoplastic polymer for use in the WPC may be present in the range of about 35 to about 45%, or about 30 to about 50%, or about 20 to about 60%, of the core component. The thermoplastic polymeric resin used in the core component 301 has little or no (less than 5 weight %, less than 1 weight %, or less than 0.1 weight %) ethylene acid copolymer ionomer.

About 40% to about 80% or about 50% to about 75% or about 55% to about 65 weight % of wood or cellulosic material may be included in compositions used for the core component 301. One (or more) cellulosic material may be used, such as those obtained from wood and wood products, such as wood pulp fibers; non-woody paper-making fibers from cotton; straws and grasses, such as rice and esparto; canes and reeds, such as bagasse; bamboos; stalks with bast fibers, such as jute, flax, kenaf, cannabis, linen and ramie; and leaf fibers, such as abaca and sisal; paper (including recycled paper) or polymer-coated paper. Preferably the cellulosic material used is from a wood source. Suitable wood sources include softwood sources, such as pines, spruces, and firs, and hardwood sources, such as oaks, maples, eucalyptuses, poplars, beeches, and aspens. The form of the cellulosic materials from wood sources may be sawdust, wood chips, wood flour, or the like. Suitable sources of wood or cellulosic fiber may include, but are not limited to, post-industrial waste streams. For example, one post-industrial waste stream source of wood fiber may be the waste stream of a saw mill.

In addition to sawdust, agricultural residues and/or waste may be used. Agricultural residues are the remainder of a crop after the crop has been harvested. Examples of such suitable residues include residues from the harvesting of wheat, rice, and corn, for example. Examples of agricultural waste can include straw; corn stalks; rice hulls; wheat; oat; barley and oat chaff; coconut shells; peanut shells; walnut shells; jute; hemp; bagasse; bamboo; flax; and kenaf, and combinations thereof.

The cellulosic materials may be screened through various screens, e.g., a 30-mesh or a 40-mesh screen, to obtain materials of a specified size, or a mixture of different sizes may be used. The size of the cellulose material used may range from less than about 9 mesh about 9 to about 100 mesh or about 40 to about 100 mesh or less than 100 mesh (e.g., able to pass through 100 mesh).

In the embodiment wherein the core component is a WPC, the core component 301 may include "regrind" or recycled coated or uncoated WPC material. The material of the regrind may be the same as the core component 301 or may be different. Such regrind materials may include materials from any coating present thereon, wherein the core component 301, after extrusion, will also include those materials. The amount of regrind material provided in the formation of the core component 301 is dependent upon the make-up of the regrind (or recycled) material. That is, the concentration of thermoplastic material present in the regrind is utilized as a portion of the thermoplastic component and is included in the amount to provide a thermoplastic component concentration meeting the desired thermoplastic material concentration discussed above. Likewise, the wood or cellulosic material present in the regrind is utilized as a portion of the wood or cellulosic material and is included in the amount to provide a wood or cellulosic material concentration meeting the desired wood or cellulosic material concentration above. Additives and/or impurities present in the regrind may also be present in the core component 301.

In the embodiment wherein the core component is a WPC or a polymer, the core component 301 may additionally comprise conventional additives used in WPCs and polymers, including plasticizers, compatibilizers or coupling agents, flexomers, stabilizers, including viscosity stabilizers and hydrolytic stabilizers, antioxidants, ultraviolet ray absorbers, anti-static agents, dyes, pigments or other coloring agents, inorganic fillers, fire-retardants, lubricants, reinforcing agents, such as glass fiber and flakes, foaming or blowing agents, processing aids, antiblock agents, release agents, pest repellants, and/or mixtures thereof. The conventional additives for use in the WPC or polymers may be present in the range of less than about 5% or from about 1 to about 5%, or less than about 1% of the core component 301. A suitable compatibilizing copolymer (compatibilizer, also referred to as coupling agent) may function to couple various components of the wood composite by covalent chemical bonding, and/or may change the chemical environment of the wood composite such that all of the components in the mixture are dispersed to form a stable composite. These compatibilizers may be present in an amount of less than about 10%, from about 0.1 to about 10, about 0.1 to about 5, or about 0.1 to about 1.0, weight % based on the total weight of the composition.

Compatibilizers include maleic anhydride graft copolymers. Maleic anhydride-grafted polymers (maleated polymers) are polymeric materials in which maleic anhydride is reacted with an existing polymer, often under free-radical conditions, to form anhydride groups appended to the polymer chain. They include maleated polyethylene, maleated polypropylene, maleated styrene-ethylene-butene-styrene triblock copolymer, and maleated polybutadiene. General discussions of anhydride coupling agents in wood composites can be found in: "Effectiveness of Functionalized Polyolefins as Compatibilizers for Polyethylene/Wood Flour Composites," Y. Wang, F. C. Yeh, S. M. Lai, H. C. Chan, and H. F. Shen in Polym. Eng. and Sci. April 2003, vol. 43, n. 4, p. 933; and, "Surface of Cellulosic Materials Modified with Functionalized Polyethylene Coupling Agents", Q. Li and L. M. Matuana in J. of Appl Polym Sci., (2003) vol. 88, p. 278, which are hereby incorporated by reference in their entirety.

Other suitable compatibilizers comprise ethylene copolymerized with a functional comonomer comprising an ethyleneically unsubstituted dicarboxylic acid or derivative thereof, selected from the group consisting of maleic anhydride; itaconic anhydride; maleic acid diesters; fumaric diesters; maleic acid monoesters or fumaric acid monoesters, including esters of C1 to C4 alcohols, such as, for example, methyl, ethyl, n-propyl, isopropyl, and n-butyl alcohols; maleic acid, itaconic acid; fumaric acid; or mixtures of any of these. The functional comonomer can be maleic anhydride, or monoesters and/or diesters of maleic acid. The copolymers may also comprise a third comonomer selected from the group consisting of vinyl acetate, acrylic acid, methacrylic acid, alkyl acrylate and methyl acrylate.

These compatibilizing copolymers can be obtained directly from the monomers by a high-pressure free radical polymerization process, described, for example, in U.S. Pat. No. 4,351,931, which is hereby incorporated by reference in its entirety. In contrast to graft copolymers, such as the maleated polymers described above, portions of the units derived from the functional comonomers form part of the polymer chain and are not appended to a pre-existing chain.

In an alternate embodiment, the core component 301 includes a core base having the materials of the core component and a coextruded layer of WPC material (e.g., polyethylene and wood particles) or polymeric material that utilizes virgin or clean polyethylene or polymer material to provide a smooth surface for application of the laminate sheet 303. The core base in this embodiment includes the materials described above with respect to the core component 301. In another embodiment, the coextruded layer may include recycled material or polyethylene material that is the same as the core base or different. For example, the coextruded layer may include less crystalline polyethylene than the polyethylene in the core base of the coextruded core component. In another embodiment, the coextruded layer includes little or no cellulosic fiber. The coextruded layer may circumferentially encapsulate the core base about the core component 301 cross-section (not shown) or may encapsulate a portion of the circumference of the cross-section.

Figure 3:
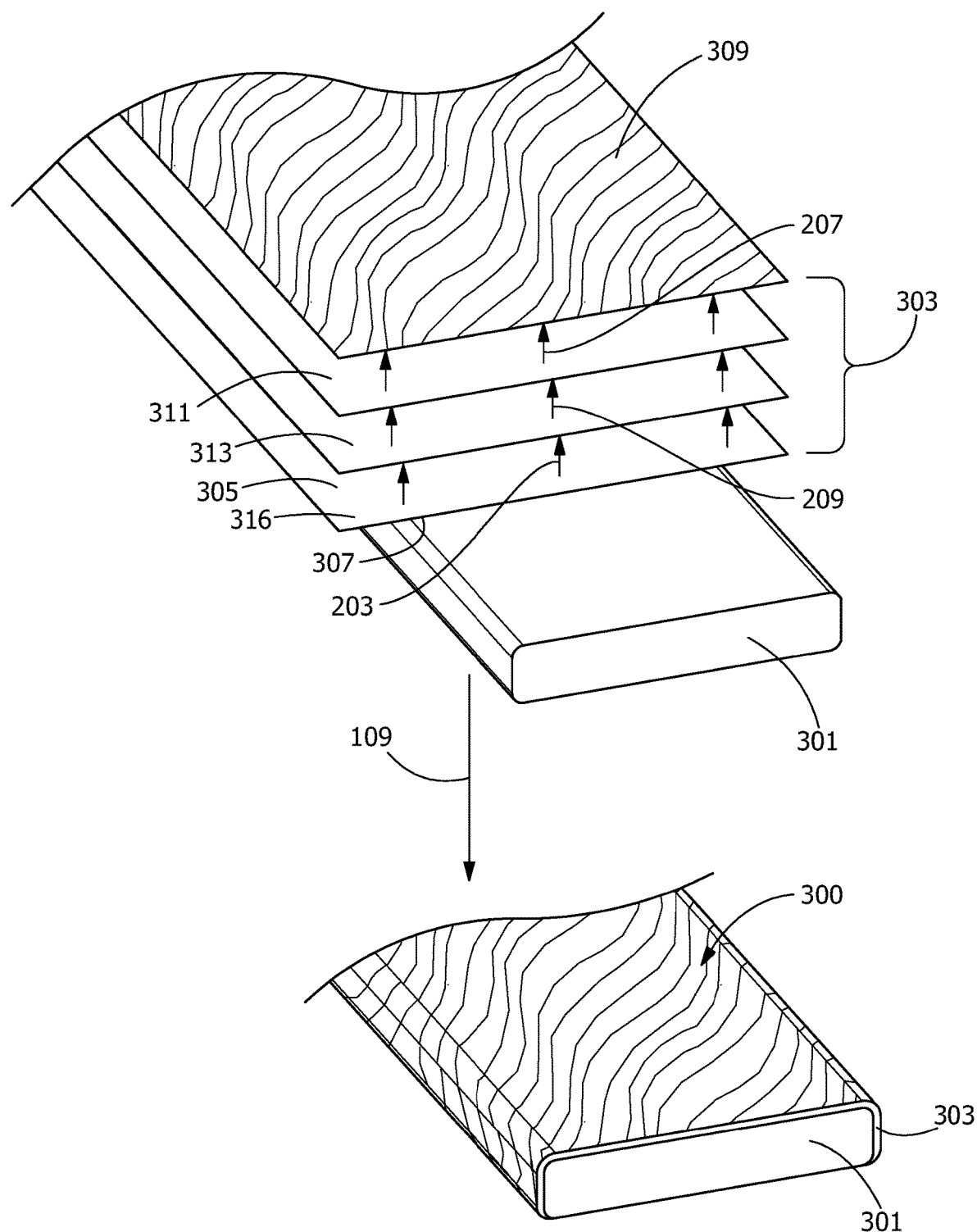
FIG. 3 schematically illustrates a process, according to an embodiment of the present disclosure.
Figure 5:
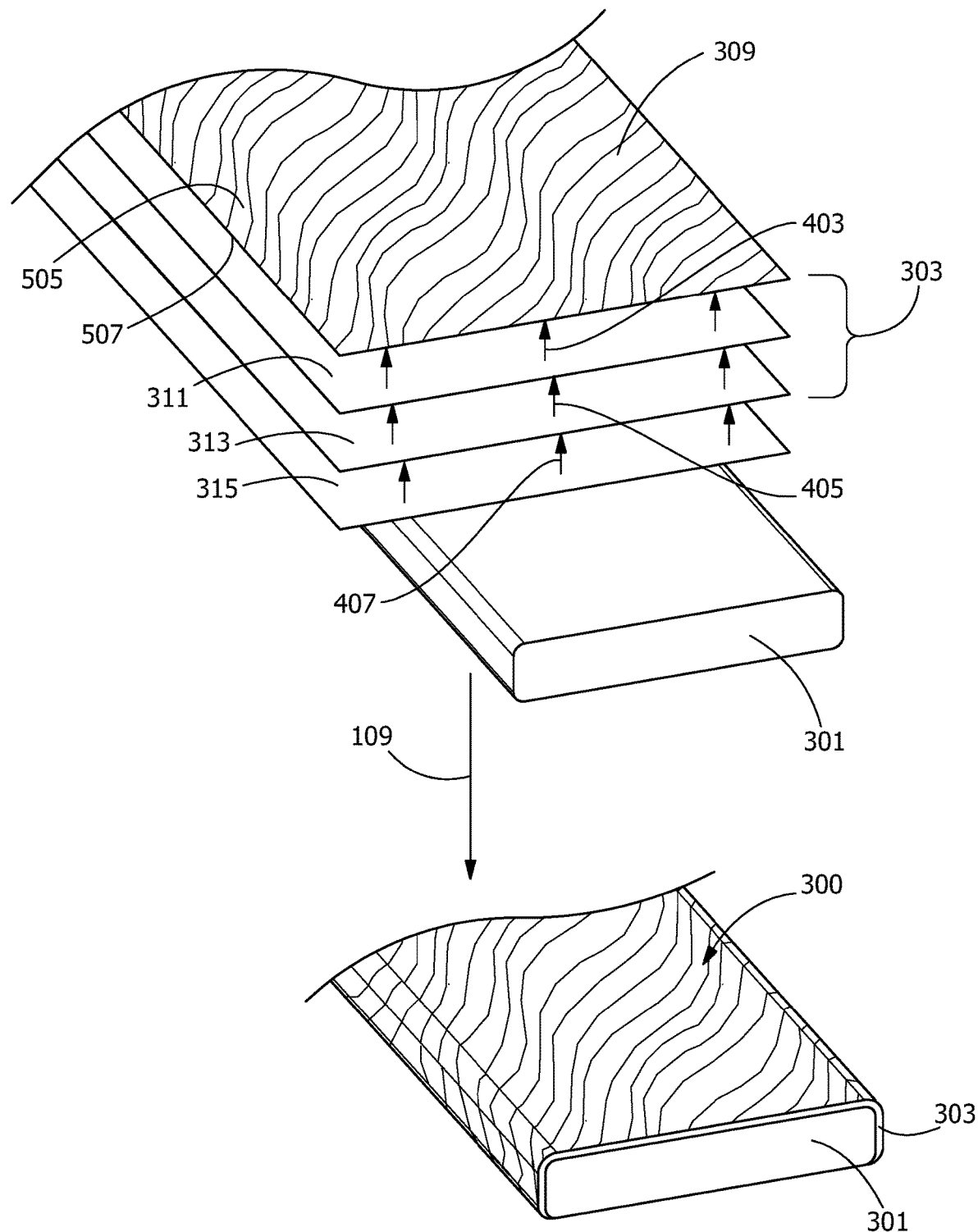
FIG. 5 schematically illustrates a process, according to another embodiment of the present disclosure.

As shown in FIG. 1, process 100 after the step of providing a core component further includes forming a laminate sheet 303 (step 105). As shown in FIGS. 3 and 5, the laminate sheet 303 includes, at a minimum, a wear layer 309 having UV absorbers and an ink layer 313. In addition, the laminate sheet 303 may include intermediate layers, such as tie layers 311, or primers, and printable films 316 (see e.g., FIG. 3) to provide desired aesthetics, additional compatibility or enhanced physical properties. The wear layer 309 includes a surface that provides resistance to wear. The ink layer 313 is a layer or multiple layers of ink applied to specific surfaces within the laminate sheet 303. Additional, conventional steps relating to polymeric processing embossing and printing may also be included in the process, according to the present disclosure.

Figure 2:
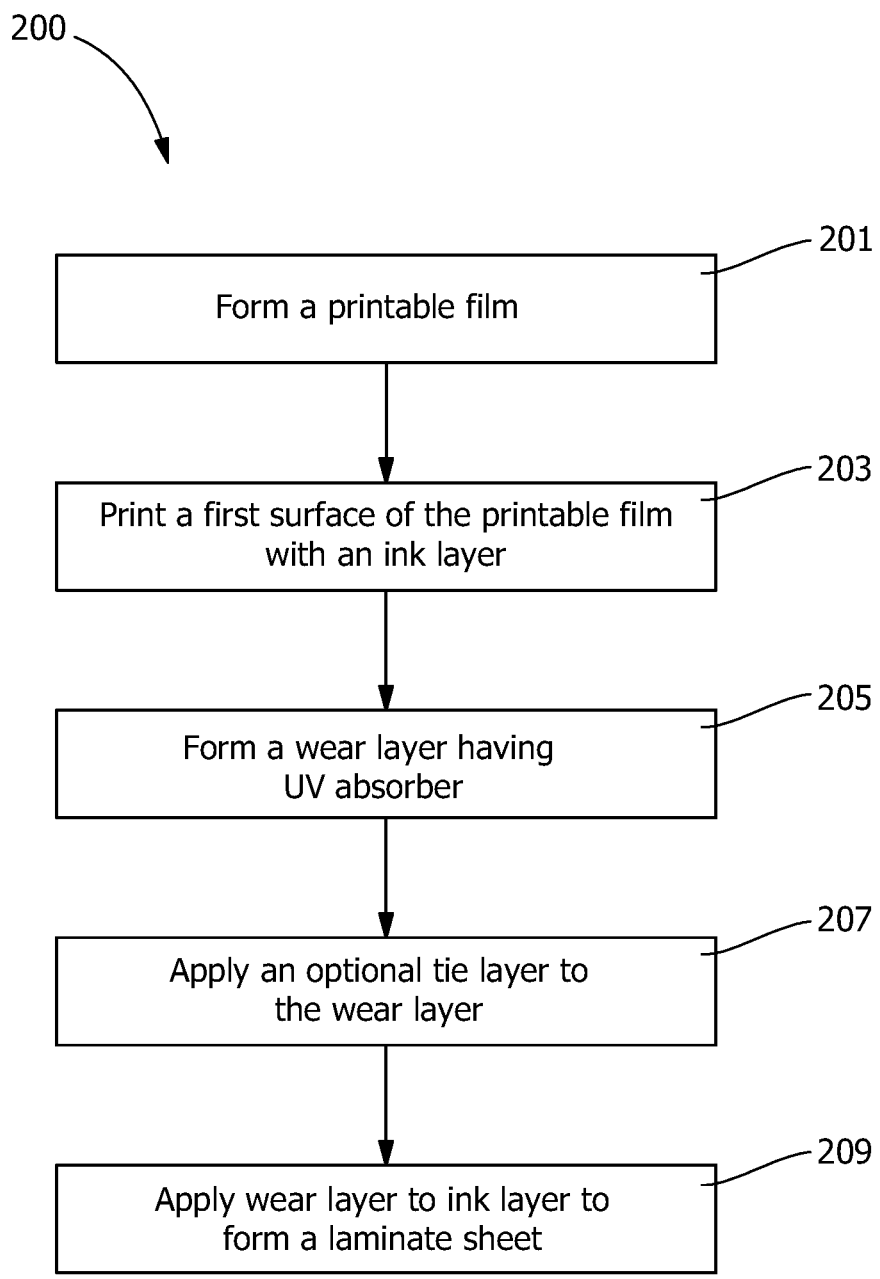
FIG. 2 shows a process for forming a laminated sheet, according to an embodiment of the present disclosure.

As shown in FIGS. 2 and 3, in one embodiment, the laminate sheet 303 is formed according to laminate sheet forming process 200. In process 200, as shown in FIG. 2, a printable film 316 is formed (step 201). The printable film 316 may include any suitable printable material and may be formed by any suitable technique. Suitable printable materials for use with the printable film 316 include, but are not limited to, acrylic films, polyester films, polyvinyl chloride (PVC) films, thermoplastic polyurethane films or polyethylene (PE) films. The printable film 316 may be formed by extrusion or any other formation technique known for forming printable films. The printable film 316 is preferably opaque or semi-opaque. In certain embodiments, the formation of printable film 316 also includes surface treating the first surface 305 of the printable film 316. Surface treating prepares the surface of the printable film 316 for printing by providing, for example, surface tension modification. One suitable surface treating process includes, but is not limited to, corona treatment (i.e. a corona discharge treatment). Alternative surface treatments include plasma treatment, pyrolysis treatment, flame or flame pyrolysis treatment, UV treatment, ozone treatment, or the like. The surface treatment increases the surface energy of the component, increasing the number of bond sites and provides a surface capable of receiving a coating layer. For example, the surface treatment, preferably a corona treatment, provides a surface tension modification to provide greater affinity to ink application. In other embodiments, the formation of printable film 316 also includes applying a tie layer to the printable film 316 (step 207). The tie layer provides a priming or preparation of the printable film 316 to render the first surface 305 suitable for printing. The application of the tie layer includes applying a primer material suitable for rendering the printable film 316 sufficiently susceptible to ink application to provide a stable ink system. Suitable printable film materials include copolymers of ethylene and methacrylic acid, such as NUCREL® resin and random ethylene copolymer having monomeric maleic anhydride equivalent, such as FUSABOND® resin. NUCREL® resin and FUSABOND® resin are available from E.I. du Pont de Nemours and Company, Inc. Other suitable printable film materials include LOTADER® resin and OREVAC™ resin are available from ARKEMA Inc and PLEXAR® resin from LyondellBasell. In another embodiment, the tie layer is omitted and an ink layer 313 is directly printed onto the printable film 316.

Process 200 further includes printing of the first surface 305 with ink layer 313 (step 203). The printing of the first surface 305 includes any suitable printing process that maintains stability in the laminate system. Suitable printing processes include, but are not limited to, gravure printing, offset, flexographic and digital printing. In one particularly suitable process, the ink is preferably a commercially available, such as a gravure ink, for example based on acrylate chemistry, applied by gravure printing.

As shown in FIGS. 2 and 3, process 200 further includes forming a wear layer 309 (step 205). The wear layer 309 includes a wear resistant material. The wear layer 309 may include a single layer or multiple layers. Wear layer 309 may be formed by extrusion or any other formation technique known for forming polymeric film systems. In addition, wear layer 309 also comprises UV absorbers, the UV absorbers being arranged and disposed to provide ink stability. Examples of suitable UV absorbers includes individual or blended antioxidants, ultraviolet light absorbers and/or hindered-amine light stabilizers such as TINUVIN®, available from BASF. UV absorbers may be provided as a layer or polymer additive for the wear layer 309. In one embodiment, the UV stabilizers and antioxidants are added to the polymer mix during processing, such as extrusion, to provide additional protection of the polymer during the formation of the wear layer 309. In other embodiments, the polymer composition is pre-stabilized prior to processing. In addition, the wear layer 309 may further include additives. Suitable additives may include, but are not limited to, compatibilizing agents, matting agents, hardening agents, or other property modifying additives.

In one embodiment, the wear layer 309 includes an acrylic material comprising the UV absorbers. A suitable acrylic copolymer for use with the multiple-layer wear layer 309 includes SOLARKOTE® copolymeric acrylic coating available from ARKEMA Inc. Other suitable acrylic material includes OPTIX® from Plaskolite, KORAD® from Spartech, and ACRYLITE® from Evonik. In addition, the acrylic material may further include additives. Suitable additives may include, but are not limited to, compatibilizing agents, matting agents, hardening agents, or other property modifying additives. Suitable additives may include hardening agents including inorganic, organic fillers and/or nanofillers. Particularly suitable inorganic fillers include fine glass, silicon dioxide, aluminum oxide, ceramic spheres, clays and combinations thereof. In other embodiments, suitable organic fillers include cellulosic material, polymeric material, non-polymeric organic material, and combinations thereof. In some embodiments, the organic filler comprises a cellulosic material selected from wood fibers, cork, wood shavings, wood flour, paper fibers, cotton linters, and combinations thereof. In some embodiments, the inorganic and organic fillers may be a fibrous material or a particulate material. In certain embodiments, in addition to the acrylic material layer, an additional hard coat is present on the surface-facing surface of the wear layer 309. One particularly suitable hard coating includes polyvinylidinefluoride (PVDF). A suitable PVDF material includes KYNAR® available from ARKEMA, INC. Suitable thickness for the PVDF layer includes from about 1 mil to about 6 mil or from about 2 mil to about 5 mil or from about 3 mil to about 4 mil or from about 4 mil to about 5 mil. Suitable thickness for the acrylic copolymer layer includes from about 7 mil to about 13 mil or from about 8 mil to about 12 mil or from about 9 mil to about 11 mil. Particularly suitable embodiments include polyvinylidinefluoride (PVDF) (KYNAR® FLEX® available from ARKEMA Inc.) coextruded or melt laminated onto an acrylic copolymer (SOLARKOTE® P600 available from ARKEMA Inc.) to form a two-layer wear layer 309. The acrylic copolymer layer is a surface that faces the ink layer 313 and provides UV screening to provide resistance to ink fade while the PVDF film is a wear surface providing scratch, wear and stain resistance. In one embodiment, the film is embossed during a coextrusion or extrusion lamination process to provide a slip resistant wear surface. Embossing may be provided by any suitable embossing process. Suitable embossing processes include utilizing a die, roller or other suitable device that provides heat and pressure on the surface to provide a pattern or design on the surface. In one embodiment, embossing may provide a wood-like surface texture and may be applied by heated embossing rolls to the surface of the wear layer 309. In one embodiment, the embossing provides a tread, ridges or features that provide both a tactile feel, as well as slip resistance. In a particularly suitable embodiment, the embossing is provided with a pattern that both provides low glare or matte appearance to the polymeric surface and mar resistance to the tread surface of the component. For example, the embossed pattern may include micro and macro features forming secondary patterns, for example, in a wood-like surface texture that provides a reduced glare on the surface. In this embodiment, the wear layer 309 is formed prior to the application of the wear layer to the ink layer (step 209).

In one embodiment, the wear layer 309 includes the acrylic material comprising the UV absorbers, as described above, with an additional layer of a urethane hard coat. Like the embodiment discussed above with respect to the PVDF, the urethane hard coat may include additives, such as inorganic, organic fillers and/or nanofillers. Suitable urethane materials include polyurethane. Particularly suitable coatings include a polyurethane coating. A particularly urethane hard coat is aliphatic polyurethane. Particularly suitable hard coat includes, aliphatic polyether polyurethane resin that may or may not be crosslinked. In this embodiment, the wear layer 309 is formed prior to the application of the wear layer to the ink layer (step 209).

In one embodiment, the wear layer 309 includes the acrylic material comprising the UV absorbers, as described above, with an additional layer of a rigid acrylic material. Like the embodiment discussed above with respect to the PVDF, the rigid acrylic material coating may include additives, such as inorganic, organic fillers and/or nanofillers. Suitable rigid acrylic materials include acrylic. Particularly suitable coatings include, for example, PLEXIGLAS® by Arkema and ACRYLITE® by Evonik. In this embodiment, the wear layer 309 is formed prior to the application of the wear layer to the ink layer (step 209).

In one embodiment, the wear layer 309 includes a layer of hot polyurethane that is applied to the ink layer 313. As discussed above with respect to the PVDF, the hot polyurethane coating preferably includes UV absorbers, the UV absorbers being arranged and disposed to provide ink stability. A particularly suitable wear layer 309 is an aliphatic hot coat polyurethane. For example, a roll coated hot coat polyurethane coating. The aliphatic hot coat polyurethane provides significant bulk to the wear layer 309, greater than a polyurethane hard coat, and has deep scratch protection. In this embodiment, a polyurethane hard coat may be applied to the hot coat polyurethane layer. The polyurethane hard coat may include additives, such as inorganic, organic fillers and/or nanofillers, which may be provided for desirable properties, including, but not limited to, scratch and slip resistance. In this embodiment, the application of the hot polyurethane wear layer 309 includes the application of the wear layer to the ink layer (step 209).

In one embodiment, the wear layer 309 includes a layer of hot polyurethane that is applied to the ink layer 313. As discussed above with respect to the PVDF, the hot polyurethane coating preferably includes UV absorbers, the UV absorbers being arranged and disposed to provide ink stability. A particularly suitable wear layer 309 is an aliphatic hot coat polyurethane. In addition, the hot polyurethane may further include additives. Suitable additives may include, but are not limited to, compatibilizing agents, matting agents, hardening agents, or other property modifying additives. In this embodiment, a polyurethane hard coat may be applied to the hot coat polyurethane layer. The polyurethane hard coat may include additives, such as inorganic, organic fillers and/or nanofillers, which may be provided for desirable properties, including, but not limited to, scratch and slip resistance. In this embodiment, the application of the hot polyurethane wear layer 309 includes the application of the wear layer to the ink layer (step 209).

In one embodiment, the wear layer 309 includes an extruded sheet material comprising an ionomer. A suitable ionomer material includes SURLYN® (available from E. I. DU PONT DE NEMOURS AND COMPANY CORPORATION) is extruded. The ionomer coating preferably includes UV absorbers, the UV absorbers being arranged and disposed to provide ink stability. The ionomer-containing composition may provide at least one of improved stain resistance, improved resistance to fading over time, and improved scuff, scratch and mar resistance compared to known WPCs. In addition, the ionomer material may further include additives. Suitable additives may include, but are not limited to, compatibilizing agents, matting agents, hardening agents, or other property modifying additives. The ionomer-containing composition used in the wear layer 309, in one embodiment, comprises an ionomer of an ethylene acid copolymer having copolymerized units of ethylene, copolymerized units of at least one C3-C8 $\alpha,\beta$-ethylenically unsaturated carboxylic acid, and optionally copolymerized units of an alkyl (meth)acrylates wherein the alkyl groups have from 1 to 8, or 1 to 4, carbon atoms, the weight percentage of copolymerized units of the unsaturated carboxylic acid in the ethylene acid copolymer can be from about 3 to about 35 weight %, based on the weight of the ethylene acid copolymer, and greater than about 30 weight % of the carboxylic acid moieties of the ethylene acid copolymer may be neutralized to salts containing one or more alkali metal, transition metal, or alkaline earth metal cations. Particularly suitable ionomers of ethylene acid copolymer for use in the wear layer 309 include zinc ionomers.

Ionomers are ionic copolymers that are obtained after neutralization of an acid copolymer. Neutralizing agents, which for the purposes of this application are basic compounds containing metal cations such as sodium, zinc, lithium, magnesium or potassium ions, are used to neutralize at least some portion of the acidic groups in the acid copolymer. Suitable ionomers are prepared from the acid copolymers described above by methods known in the art of preparing ionomers, such as those described in U.S. Pat. No. 3,264,272, which is hereby incorporated by reference in its entirety.

The level of neutralization, for example, may range from a lower limit of about 30, to an upper limit of about 40%, about 50, about 60, about 70, about 80, about 90, or about 100%, based on the total carboxylic acid content, with a metallic ion. For example, neutralization levels may be about 30 to about 70%. The metallic ions may be monovalent, divalent, trivalent, multivalent, or combinations of two or more thereof. Examples include Li, Na, K, Cu, Mg, Ca, Fe, Co, Zn, and combinations of two or more thereof. If the metallic ion is multivalent, a complexing agent, such as stearate, oleate, salicylate, and phenolate radicals, may be included, as disclosed in U.S. Pat. No. 3,404,134. Preferred cations include Na, Zn, or combinations thereof. Most preferred are zinc cations.

In certain embodiments, the formation of wear layer 309 also includes applying a tie layer to the ionomer film. The tie layer provides a priming or preparation of the ionomer film to render the ionomer compatible with the ink utilized from printing. Suitable tie layer materials include, but are not limited to, an acrylic polymer film. Suitable printable film materials include copolymers of ethylene and methacrylic acid, such as NUCREL® resin and random ethylene copolymer having monomeric maleic anhydride equivalent, such as FUSABOND® resin. NUCREL® resin and FUSABOND® resin are available from E.I. du Pont de Nemours and Company, Inc. Other suitable tie layer materials include LOTADER® resin and OREVAC™ resin are available from ARKEMA Inc and PLEXAR® resin from LyondellBasell In one embodiment, the wear layer 309 includes a tie-layer adjacent the ink layer 313, an ionomer layer overlaying the tie-layer and a urethane hard coat. In this embodiment, a polyurethane hard coat may be applied to the hot coat polyurethane layer. The polyurethane hard coat may include additives, such as inorganic, organic fillers and/or nanofillers, which may be provided for desirable properties, including, but not limited to, scratch and slip resistance. In this embodiment, the wear layer 309 is formed prior to the application of the wear layer to the ink layer (step 209).

In one embodiment, the wear layer 309 includes a layer of thermoplastic polyurethane (TPU) adjacent the ink layer 313. As discussed above with respect to the PVDF, the TPU coating preferably includes UV absorbers, the UV absorbers being arranged and disposed to provide ink stability. In one embodiment, the TPU coating includes a single layer coating comprising additives, such as inorganic, organic fillers and/or nanofillers, which may be provided for desirable properties, including, but not limited to, scratch and slip resistance. In this embodiment, a polyurethane hard coat may be applied to the hot coat polyurethane layer. The polyurethane hard coat may include additives, such as inorganic, organic fillers and/or nanofillers, which may be provided for desirable properties, including, but not limited to, scratch and slip resistance. In the embodiment comprising the polyurethane hard coat, the TPU coating may not include the inorganic, organic fillers and/or nanofillers. In this embodiment, the wear layer 309 is formed prior to the application of the wear layer to the ink layer (step 209).

As shown in FIGS. 2 and 3, process 200 further includes applying the wear layer 309 formed to the ink layer 313 to form the laminate sheet 303 (step 209). As shown in FIG. 1, the laminate sheet 303 is applied to the core component 301 (step 109) to form the laminated article 300 (see FIG. 3). The application of the laminate sheet 303 may be provided via a thermal lamination. In another embodiment, not shown in FIGS. 2 and 3, after the laminate sheet 303 is formed (step 209), an adhesive 315 may be applied to the printed surface having ink layer 313. In this embodiment, the adhesive applied sheet is then applied to the core component 301 (step 109) to form the laminated article 300 (see FIG. 3).

Figure 4:
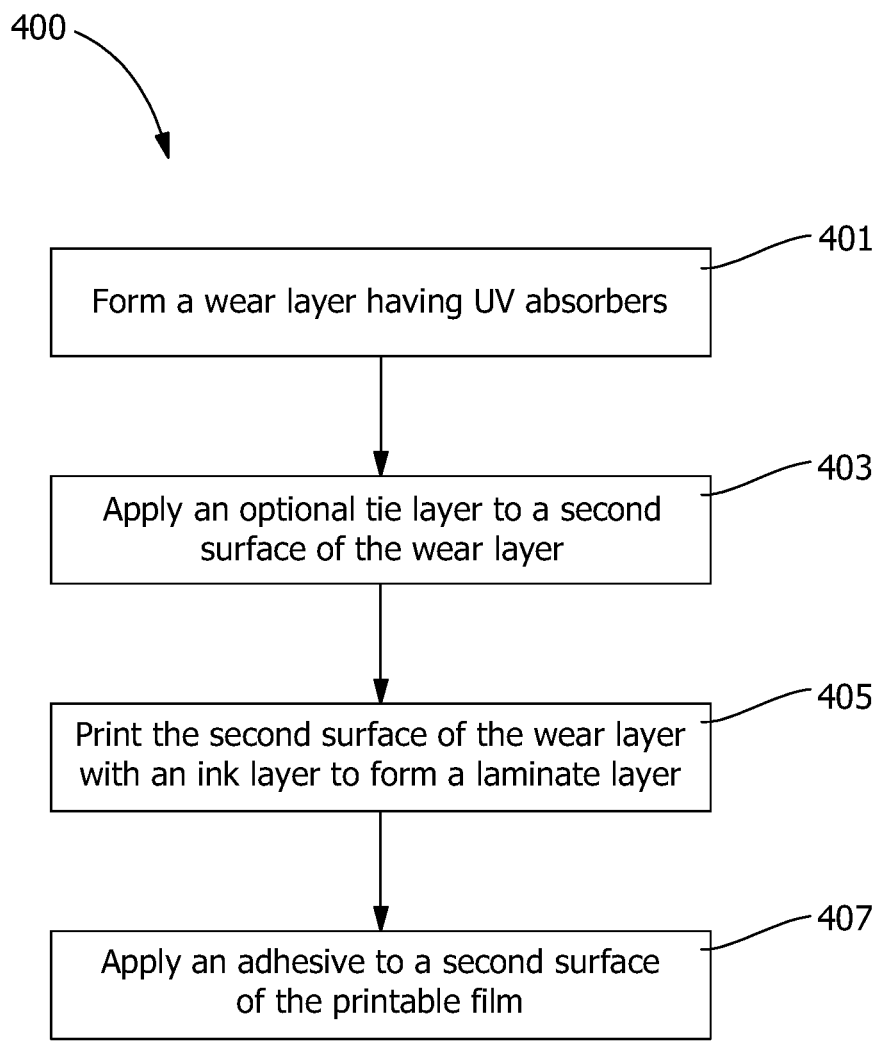
FIG. 4 shows a process for forming a laminated sheet, according to another embodiment of the present disclosure.

As shown in FIGS. 4 and 5, in one embodiment, the laminate sheet 303 is formed according to laminate sheet forming process 400. In process 400, as shown in FIG. 5, a wear layer 309 is formed (step 401). The wear layer 309 includes a wear resistant material. In addition, wear layer 309 also comprises UV absorbers, the UV absorbers being arranged and disposed to provide ink stability. Examples of suitable UV absorbers include individual or blended antioxidants, ultraviolet light absorbers and/or hindered-amine light stabilizers, such as TINUVIN®, available from BASF. UV absorbers may be provided as a layer or polymer additive for the wear layer 309. In one embodiment, the UV stabilizers and antioxidants are added to the polymer mix during processing, such as extrusion, to provide additional protection of the polymer during the formation of the wear layer 309. In other embodiments, the polymer composition is pre-stabilized prior to processing.

In one embodiment, the wear layer 309 includes an acrylic material comprising the UV absorbers. A suitable acrylic copolymer for use with the multiple-layer wear layer 309 includes SOLARKOTE® copolymeric acrylic coating available from ARKEMA Inc. Other suitable acrylic material includes OPTIX® from Plaskolite, KORAD® from Spartech, and ACRYLITE® from Evonik. In addition, the acrylic material may further include additives. Suitable additives may include, but are not limited to, compatibilizing agents, matting agents, hardening agents, or other property modifying additives. Suitable additives may include hardening agents including inorganic, organic fillers and/or nanofillers. Particularly suitable inorganic fillers include fine glass, silicon dioxide, aluminum oxide, ceramic spheres, and combinations thereof. In other embodiments, suitable organic fillers include cellulosic material, polymeric material, non-polymeric organic material, and combinations thereof. In some embodiments, the organic filler comprises a cellulosic material selected from wood fibers, cork, wood shavings, wood flour, paper fibers, cotton linters, and combinations thereof. In some embodiments, the inorganic, organic fillers and/or nanofillers s may be a fibrous material or a particulate material. In certain embodiments, in addition to the acrylic material wear layer 309, an additional hard coat is present on the first surface 505 of the wear layer 309. One particularly suitable hard coating includes polyvinylidinefluoride (PVDF). A suitable PVDF material includes KYNAR® available from ARKEMA, INC. Suitable thickness for the PVDF layer includes from about 1 mil to about 6 mil or from about 2 mil to about 5 mil or from about 3 mil to about 4 mil or from about 4 mil to about 5 mil. Suitable thickness for the acrylic copolymer layer includes from about 7 mil to about 13 mil or from about 8 mil to about 12 mil or from about 9 mil to about 11 mil. Particularly suitable embodiments include polyvinylidinefluoride (PVDF) (KYNAR FLEX® available from ARKEMA Inc.) coextruded or melt laminated onto an acrylic copolymer (SOLARKOTE® P600 available from ARKEMA Inc.) to form a two-layer wear layer 309. The acrylic copolymer layer is applied to second surface 507 of the PVDF layer and provides UV screening to provide resistance to ink fade while the PVDF film is a wear surface providing scratch, wear and stain resistance. In one embodiment, the film is embossed during a coextrusion or extrusion lamination process to provide a slip resistant wear surface. Embossing may be provided by any suitable embossing process. Suitable embossing processes include utilizing a die, roller or other suitable device that provides heat and pressure on the surface to provide a pattern or design on the surface. In one embodiment, embossing may provide a wood-like surface texture and may be applied by heated embossing rolls to the surface of the wear layer 309. In one embodiment, the embossing provides a tread, ridges or features that provide both a tactile feel, as well as slip resistance. In a particularly suitable embodiment, the embossing is provided with a pattern that both provides low glare or matte appearance to the polymeric surface and mar resistance to the tread surface of the component. For example, the embossed pattern may include micro and macro features forming secondary patterns, for example, in a wood-like surface texture that provide a reduced glare on the surface.

In one embodiment, the wear layer 309 includes the acrylic material comprising the UV absorbers, as described above, with an additional layer of a urethane hard coat. Like the embodiment discuss above with respect to the PVDF, the urethane hard coat may include additives, such as inorganic, organic fillers and/or nanofillers. Suitable urethane materials include polyurethane. Particularly suitable coatings include a polyurethane coating. A particularly urethane hard coat is aliphatic polyurethane. Particularly suitable hard coat includes, aliphatic polyether polyurethane resin that may or may not be crosslinked.

In one embodiment, the wear layer 309 includes an acrylic material comprising the UV absorbers, as described above, with an additional layer of a rigid acrylic material. Like the embodiment discuss above with respect to the PVDF, the rigid acrylic material coating may include additives, such as inorganic, organic fillers and/or nanofillers. Suitable rigid acrylic materials include. Particularly suitable rigid acrylic include PLEXIGLAS® by Arkema; ACRYLITE® by Evonik.

In one embodiment, the wear layer 309 includes an extruded sheet material comprising an ionomer. A suitable ionomer material includes SURLYN® (available from E. I. DU PONT DE NEMOURS AND COMPANY CORPORATION) is extruded. The ionomer coating preferably includes UV absorbers, the UV absorbers being arranged and disposed to provide ink stability.

In certain embodiments, the formation of wear layer 309 also optionally includes applying a tie layer to the second surface 507 of the ionomer film (step 403). The tie layer 311 provides a priming or preparation of the ionomer film to render the ionomer compatible with the ink utilized from printing. Suitable tie layer materials include, but are not limited to, an acrylic polymer film. Suitable printable film materials include copolymers of ethylene and methacrylic acid, such as NUCREL® resin and random ethylene copolymer having monomeric maleic anhydride equivalent, such as FUSABOND® resin. NUCREL® resin and FUSABOND® resin are available from E.I. du Pont de Nemours and Company, Inc. In one embodiment, the wear layer 309 on the second surface 507 of the wear layer 309, includes an ionomer layer overlaying the tie-layer and a urethane hard coat. In this embodiment, a polyurethane hard coat may be applied to the first surface 505 of the ionomer film. The polyurethane hard coat may include additives, such as inorganic, organic fillers and/or nanofillers, which may be provided for desirable properties, including, but not limited to, scratch and slip resistance.

In one embodiment, the wear layer 309 includes a layer of thermoplastic polyurethane (TPU) adjacent the ink layer 313. As discussed above with respect to the PVDF layer, the TPU coating preferably includes UV absorbers, the UV absorbers being arranged and disposed to provide ink stability. In one embodiment, the TPU coating includes a single layer coating comprising additives, such as inorganic, organic fillers and/or nanofillers, which may be provided for desirable properties, including, but not limited to, scratch and slip resistance. In this embodiment, a polyurethane hard coat may be applied to the hot coat polyurethane layer. The polyurethane hard coat may include additives, such as inorganic, organic fillers and/or nanofillers, which may be provided for desirable properties, including, but not limited to, scratch and slip resistance. In the embodiment comprising the polyurethane hard coat, the TPU coating may not include the inorganic, organic fillers and/or nanofillers.

As shown in FIGS. 4 and 5, process 400 further includes applying the ink layer 313 to the wear layer 309 to form the laminate sheet 303 (step 405). The step of applying the ink layer 313 preferably includes a subcoat on the ink layer 313. The subcoat is an opaque or semi-opaque ink layer applied over the initially applied ink layer. The subcoat is preferably arranged to provide a background to provide a desirable aesthetic showing particular images or patterns in the ink layer 313. After the laminate sheet 303 is formed (step 405), an adhesive 315 is applied to the printed surface having ink layer 313 (step 407). The adhesive applied sheet is then applied to the core component 301 (step 109) to form the laminated article 300 (see FIG. 3).

Figure 6:
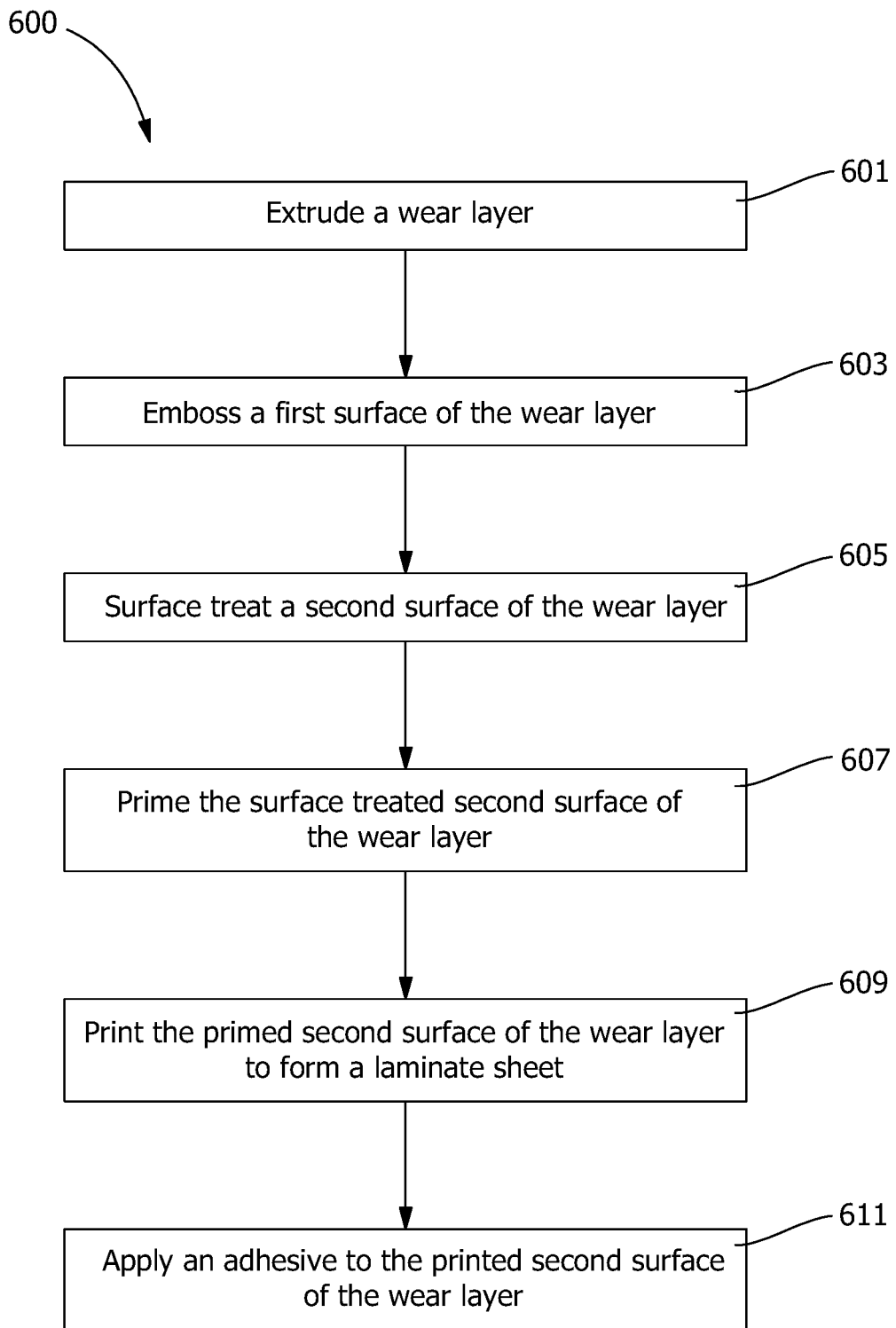
FIG. 6 shows a process for forming a laminated sheet, according to another embodiment of the present disclosure.
Figure 7:
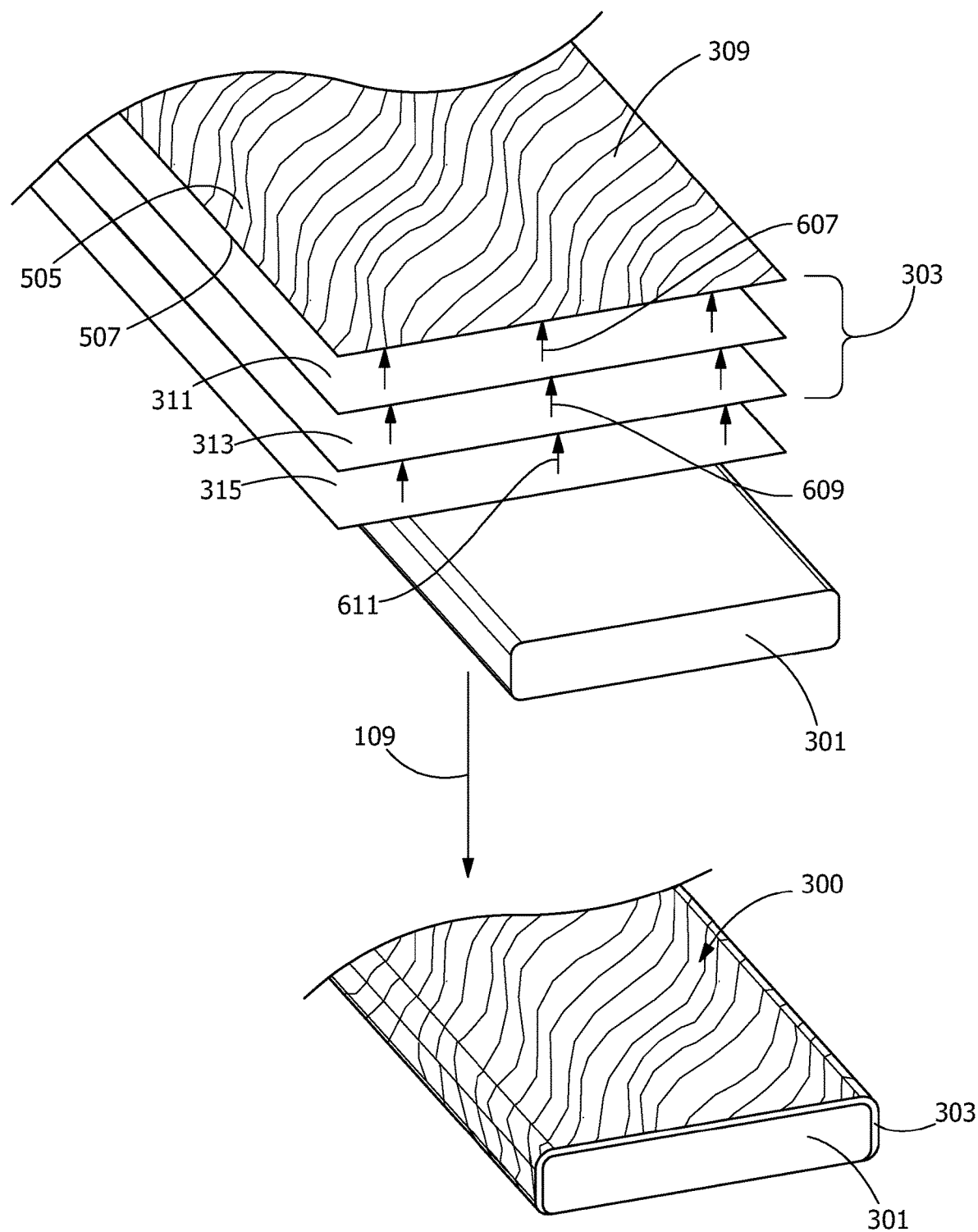
FIG. 7 schematically illustrates a process, according to an embodiment of the present disclosure.

As shown in FIGS. 6 and 7, in one embodiment, the laminate sheet 303 is formed according to laminate sheet forming process 600. In process 600, as shown in FIG. 6, a wear layer 309 is extruded (step 601). The wear layer 309 includes a wear resistant material. In addition, wear layer 309 also comprises UV absorbers, the UV absorbers being arranged and disposed to provide ink stability. Examples of suitable UV absorbers include individual or blended antioxidants, ultraviolet light absorbers and/or hindered-amine light stabilizers, such as TINUVIN®, available from BASF. UV absorbers may be provided as a layer or polymer additive for the wear layer 309. In one embodiment, the UV stabilizers and antioxidants are added to the polymer mix during processing, such as extrusion, to provide additional protection of the polymer during the formation of the wear layer 309. In other embodiments, the polymer composition is pre-stabilized prior to processing.

In one embodiment, the wear layer 309 includes an extruded sheet material comprising an ionomer. A suitable ionomer material includes SURLYN® (available from E. I. DU PONT DE NEMOURS AND COMPANY CORPORATION) is extruded. The ionomer-containing composition may provide at least one of improved stain resistance, improved resistance to fading over time, and improved scuff, scratch and mar resistance compared to known WPCs. The ionomer-containing composition used in the wear layer 309, in one embodiment, comprises an ionomer of an ethylene acid copolymer having copolymerized units of ethylene, copolymerized units of at least one C3-C8 α,β-ethylenically unsaturated carboxylic acid, and optionally copolymerized units of an alkyl (meth)acrylates wherein the alkyl groups have from 1 to 8, or 1 to 4, carbon atoms, the weight percentage of copolymerized units of the unsaturated carboxylic acid in the ethylene acid copolymer can be from about 3 to about 35 weight %, based on the weight of the ethylene acid copolymer, and greater than about 30 weight % of the carboxylic acid moieties of the ethylene acid copolymer may be neutralized to salts containing one or more alkali metal, transition metal, or alkaline earth metal cations. Particularly suitable ionomers of ethylene acid copolymer for use in the wear layer 309 include zinc ionomers.

The formed wear layer 309 includes a first surface 505 and a second surface 507 (see FIG. 6). Process 600 includes embossing the first surface 505 of the wear layer 309 (step 603). The embossing includes a die, roller or other suitable device that provides heat and pressure on the surface to provide a pattern or design on the surface. In one embodiment, embossing may provide a wood-like surface texture and may be applied by heated embossing rolls to the surface of the wear layer 309. In one embodiment, the embossing provides a tread, ridges or features that provide both a tactile feel, as well as slip resistance. In a particularly suitable embodiment, the embossing is provided with a pattern that both provides low glare or matte appearance to the polymeric surface and mar resistance to the tread surface of the component. For example, the embossed pattern may include micro and macro features forming secondary patterns, for example, in a wood-like surface texture that provide a reduced glare on the surface.

Process 600 for forming the laminate sheet 303, as shown in FIGS. 6 and 7, also includes surface treating the second surface 507 of the wear layer 309 (step 605). Surface treating prepares the surface of the wear layer 309 for printing by providing, for example, surface tension modification. One suitable surface treating process includes, but is not limited to, corona treatment (i.e. a corona discharge treatment). Alternative surface treatments include plasma treatment, pyrolysis treatment, flame or flame pyrolysis treatment, UV treatment, ozone treatment, or the like. The surface treatment increases the surface energy of the component, increasing the number of bond sites and provides a surface capable of receiving a coating layer. For example, the surface treatment, preferably a corona treatment, provides a surface tension modification to provide greater affinity to ink application.

Process 600 for forming the laminate sheet 303, as shown in FIGS. 6 and 7, also optionally includes priming the second surface 507 of the wear layer 309 (step 607) that has been surface treated with a primer or tie layer 311. Priming the second surface 507 with primer 311 includes applying a primer material suitable for rendering the surface treated wear layer 309 sufficiently susceptible to ink application to provide a stable ink system. Suitable priming materials include, but are not limited to, polyethylenimine (PEI), ethylene acrylic acid copolymer (EAA), and emulsified terpolymer. In another embodiment, the priming (step 607) is omitted and the surface treated second surface 507 is directly printed with the ink layer 313.

Process 600 for forming the laminate sheet 303, as shown in FIGS. 6 and 7, also includes printing the second surface 507 of the wear layer 309 (step 609) that has been (optionally) primed with an ink layer 313. Printing of the second surface 507 with ink layer 313 includes any suitable printing process that maintains stability in the laminate system. Suitable printing processes include, but are not limited to, gravure printing, flexographic and digital printing. In one particularly suitable process, the ink is preferably a gravure ink applied by gravure printing. After the laminate sheet 303 is formed (step 609), an adhesive 315 is applied to the printed surface having ink layer 313 (step 611). The adhesive applied sheet is then applied to the core component 301 (step 109) to form the laminated article 300 (see FIG. 6).

Figure 8:
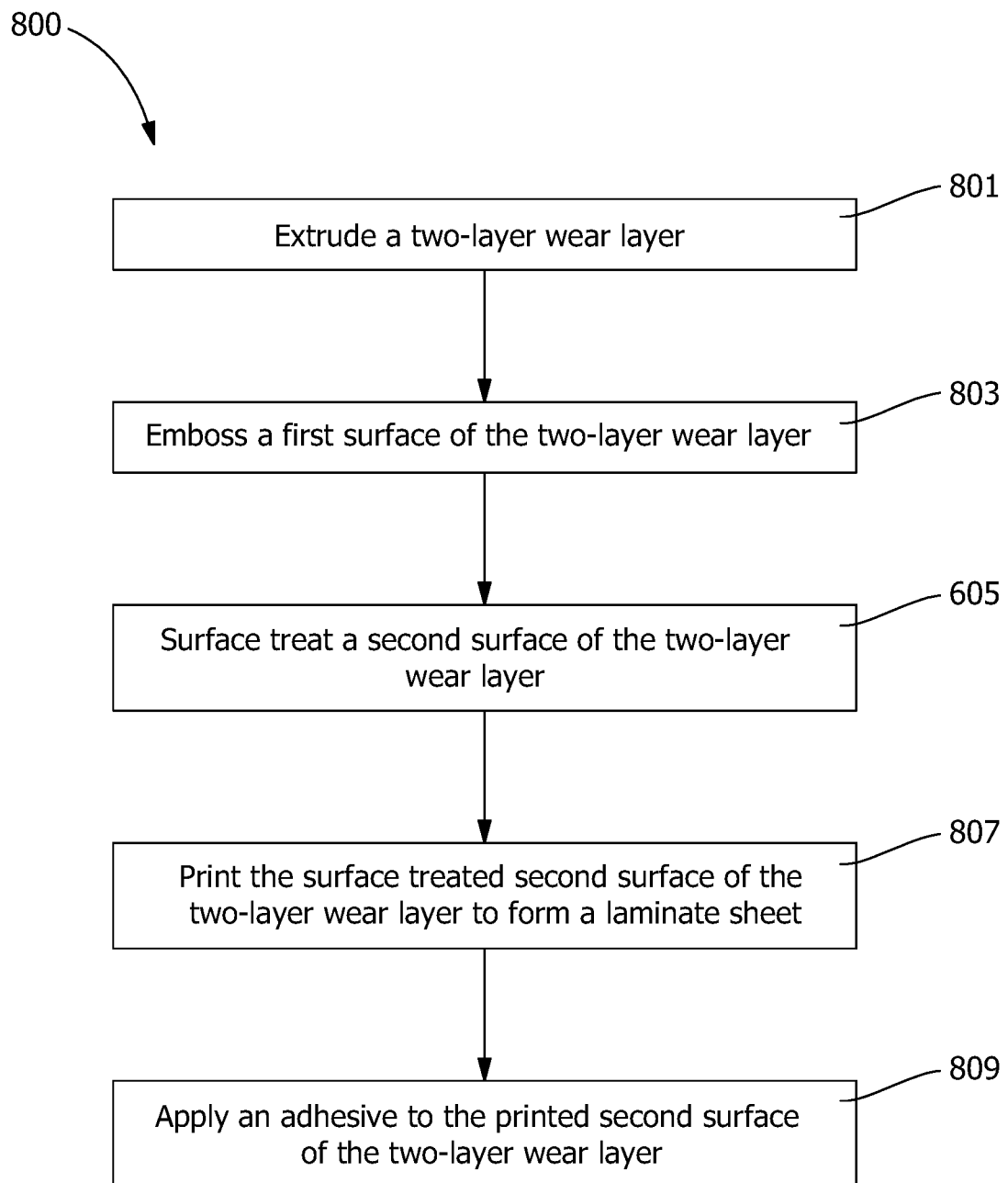
FIG. 8 shows a process for forming a laminated sheet, according to another embodiment of the present disclosure.
Figure 9:
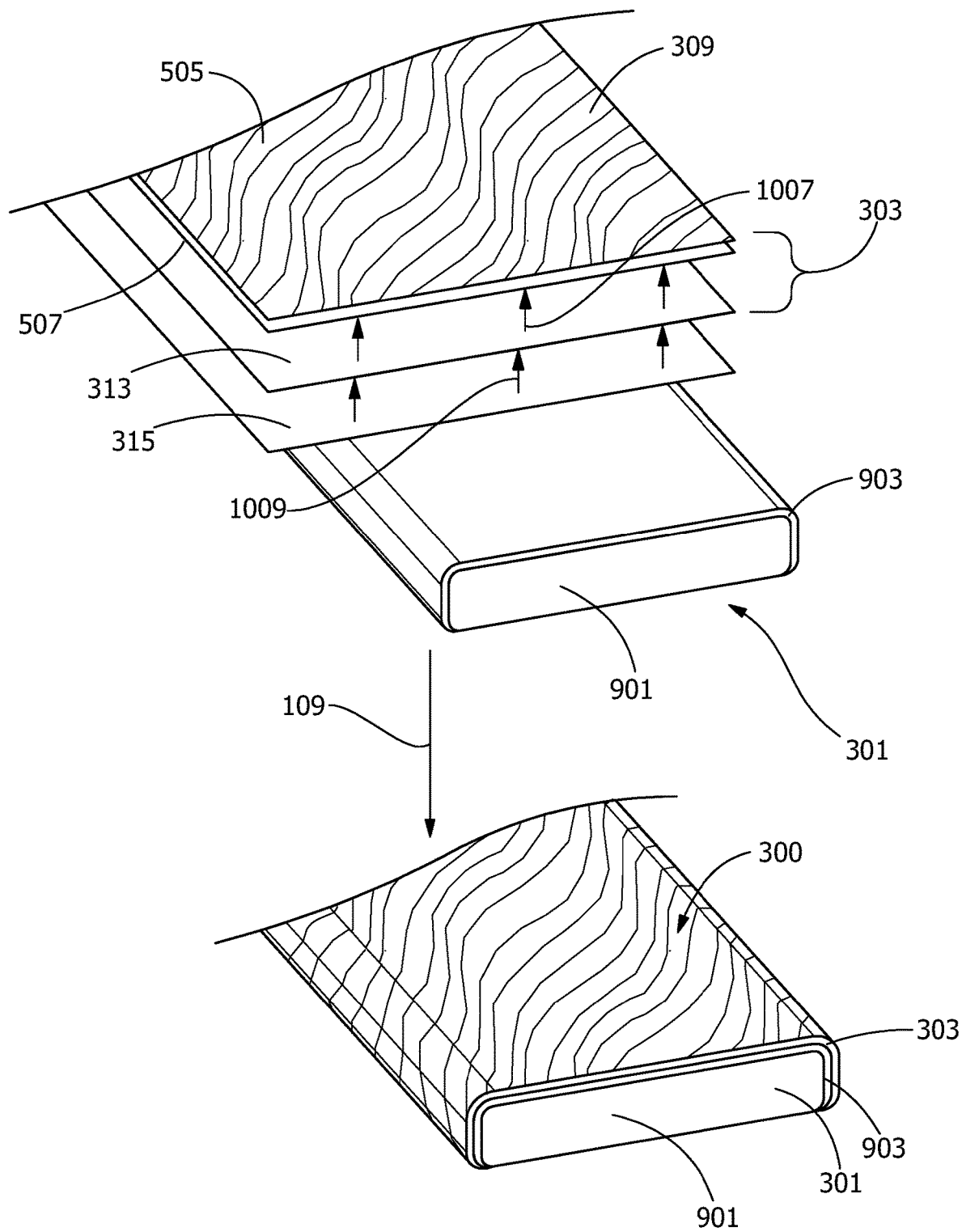
FIG. 9 schematically illustrates a process, according to another embodiment of the present disclosure.

As shown in FIGS. 8 and 9, in one embodiment, the laminate sheet 303 is formed according to laminate sheet forming process 800. In process 800, as shown in FIG. 8, a wear layer 309 is extruded (step 801). The wear layer 309 includes a wear resistant material. In addition, wear layer 309 also comprises UV absorbers, the UV absorbers being arranged and disposed to provide ink stability. In one embodiment, the wear layer 309 includes a coextruded two-layer sheet material comprising a polyvinylidinefluoride (PVDF) and acrylic copolymer. A suitable PVDF material includes KYNAR® available from ARKEMA, INC. A suitable acrylic copolymer for use with the two-layer wear layer 309 includes SOLARKOTE® copolymeric acrylic coating available from ARKEMA Inc. Suitable thickness for the PVDF layer includes from about 1 mil to about 6 mil or from about 2 mil to about 5 mil or from about 3 mil to about 4 mil or from about 4 mil to about 5 mil. Suitable thickness for the acrylic copolymer layer includes from about 7 mil to about 13 mil or from about 8 mil to about 12 mil or from about 9 mil to about 11 mil. Particularly suitable embodiments include polyvinylidinefluoride (PVDF) (KYNAR FLEX® 2850 available from ARKEMA Inc.) coextruded or melt laminated onto an acrylic copolymer (SOLARKOTE® P600 available from ARKEMA Inc.) to form a two-layer wear layer 309. The formed two-layer wear layer 309 includes a first surface 505 and a second surface 507 (see FIG. 9). The first surface 505 corresponds to the PVDF material portion of the two-layer wear layer 309 and the second surface 507 corresponds to the acrylic copolymeric material portion of the two-layer wear layer 309. The acrylic copolymer is the print surface and provides UV screening to provide resistance to ink fade while the PVDF film is a wear surface providing scratch, wear and stain resistance. The film is embossed during the coextrusion or extrusion lamination process to provide a slip resistant wear surface. Process 800 includes embossing the first surface 505 of the two-layer wear layer 309 (step 803). Embossing may be provided by any suitable embossing process. Suitable embossing processes include, but are not limited to, those embossing steps described above in the description of FIGS. 6 and 7.

Process 800 for forming the laminate sheet 303, as shown in FIGS. 8 and 9, also includes surface treating the second surface 507 of the two-layer wear layer 309 (step 805). Surface treatment may be provided by any suitable surface treatment process. Suitable surface treatment processes include, but are not limited to, those surface treatment steps described above in the description of FIGS. 6 and 7.

Process 800 for forming the laminate sheet 303, as shown in FIGS. 8 and 9, also includes printing the second surface 507 of the two-layer wear layer 309 (step 807) that has been surface treated with an ink layer 313. In another embodiment, the surface may be primed prior to application of ink layer 313.

Printing of the second surface 507 with ink layer 313 includes any suitable printing process that maintains stability in the laminate system. Suitable printing processes include, but are not limited to, gravure printing and digital printing. In one particularly suitable process, the ink is preferably a gravure ink applied by gravure printing. After the laminate sheet 303 is formed (step 807), an adhesive 315 is applied to the printed surface having ink layer 313 (step 809). The adhesive applied sheet is then applied to the core component 301 (step 109) to form the laminated article 300 (see FIG. 8).

In the embodiment shown in FIGS. 8 and 9, the core component 301 includes a core base 901 and a coextruded layer 903 of WPC material (e.g., polyethylene and wood particles) that utilizes virgin or clean polyethylene material to provide a smooth surface for application of the laminate sheet 303 (see, for example, FIG. 9). The core base 901 includes the WPC materials described above with respect to the core component 301. The coextruded layer 903 of WPC material may include recycled material or polyethylene material that is the same as the core base 901 or different. For example, the coextruded layer 903 may include less crystalline polyethylene than the polyethylene in the core base 901 of the co-extruded core component 301.

Figure 10:
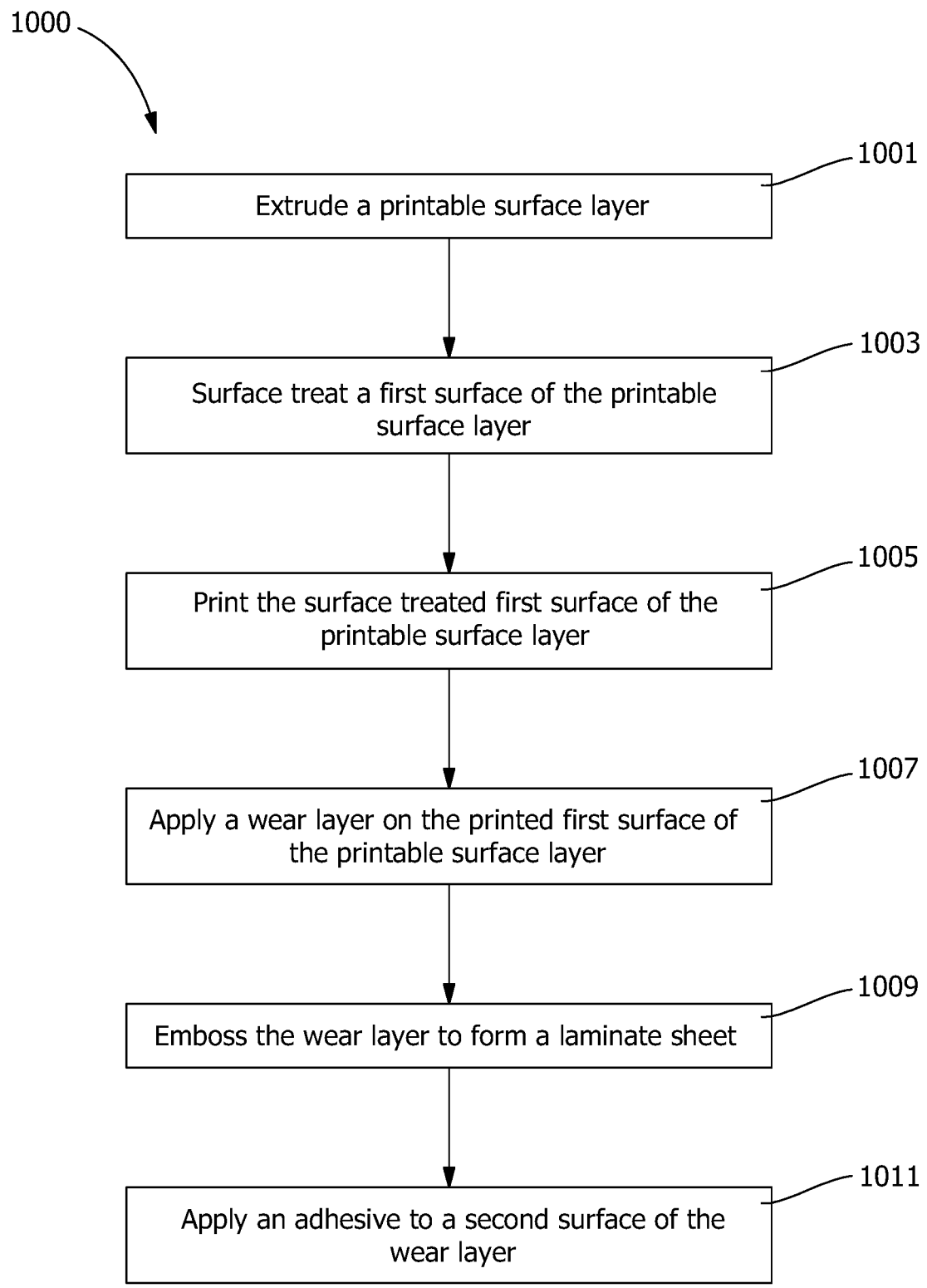
FIG. 10 shows a process for forming a laminated sheet, according to another embodiment of the present disclosure.
Figure 11:
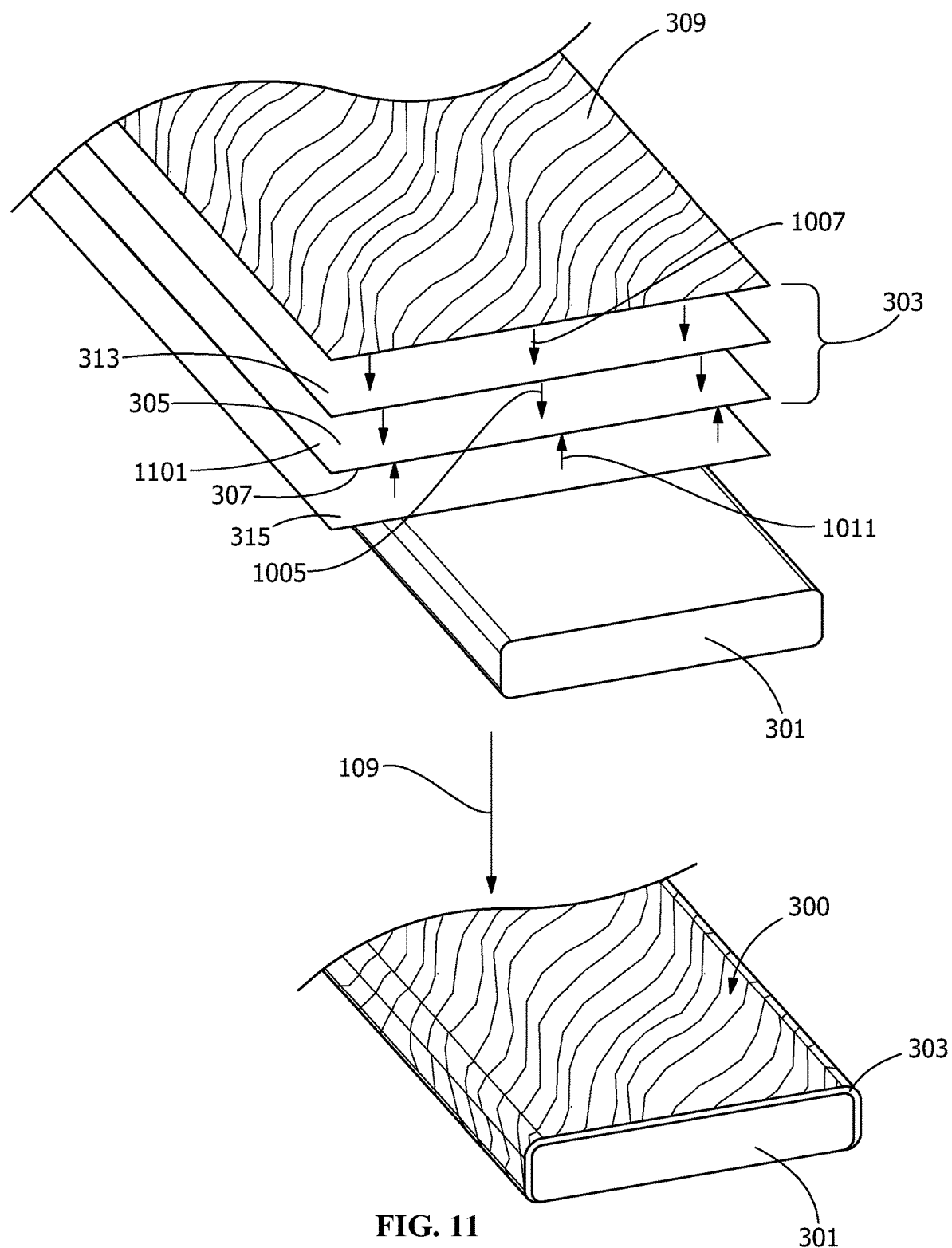
FIG. 11 schematically illustrates a process, according to an embodiment of the present disclosure.

As shown in FIGS. 10 and 11, in one embodiment, the laminate sheet 303 is formed according to laminate sheet forming process 1000. Process 1000, as shown in FIG. 10, includes extruding a printable surface layer 1101 (step 1001). The printable surface layer 1101 includes a printable material. In one embodiment, the printable material includes, but is not limited to, an acrylic polymer film. Suitable printable materials include copolymers of ethylene and methacrylic acid, such as NUCREL® resin and random ethylene copolymer having monomeric maleic anhydride equivalent, such as FUSABOND® resin. NUCREL® resin and FUSABOND® resin are available from E.I. du Pont de Nemours and Company, Inc. The formed printable surface layer 1101 includes a first surface 305 and a second surface 307 (see FIG. 11).

In an alternate embodiment, the core component 301 includes a core base 901 and a coextruded layer 903 of WPC material (e.g., polyethylene and wood particles) that utilizes virgin or clean polyethylene material to provide a smooth surface for application of the laminate sheet 303 (see, for example, FIG. 9). The core base 901 includes the WPC materials described above with respect to the core component 301. In another embodiment, the coextruded layer 903 of WPC material may include recycled material or polyethylene material that is the same as the core base 901 or different. For example, the coextruded layer 903 may include less crystalline polyethylene than the polyethylene in the core base 901 of the co-extruded core component 301.

Process 1000 for forming the laminate sheet 303, as shown in FIGS. 10 and 11, also includes surface treating the first surface 305 of the printable surface layer 1101 (step 1003). Surface treatment may be provided by any suitable surface treatment process. Suitable surface treatment processes include, but are not limited to, those surface treatment steps described above in the description of FIGS. 6 and 7.

Process 1000 for forming the laminate sheet 303, as shown in FIGS. 10 and 11, also includes printing the first surface 305 of the printable surface layer 1101 (step 1005) that has been surface treated with an ink layer 313. In another embodiment, the surface may be primed prior to application of ink layer 313 and/or the printable surface layer 1101 may be fabricated to be pre-primed. Printing of the second surface 307 with ink layer 313 includes any suitable printing process that maintains stability in the laminate system. Suitable printing processes include, but are not limited to, gravure printing and digital printing. Process 1000 for forming the laminate sheet 303, as shown in FIGS. 10 and 11, also includes applying a wear layer 309 on the first surface 305 of the printable surface layer 1101 (step 1007) subsequent to the printing on the printable surface layer 1101. The applied wear layer 309 includes a wear-resistant material. Suitable wear-resistant materials include polyurethane coating. Particularly suitable coatings include a hot polyurethane coating. A particularly suitable wear layer 309 is an aliphatic hot coat polyurethane. Other additives, such as aluminum oxide, may be provided for desirable properties, including, but not limited to, scratch and slip resistance. The applied wear layer 309 includes a wear resistant material and also comprises UV absorbers, the UV absorbers being arranged and disposed to provide ink stability.

Process 1000 includes embossing the first surface 305 of the wear layer 309 (step 1009) to form the laminate sheet 303. Embossing may be provided by any suitable surface treatment process. Embossing processes include, but are not limited to, those embossing steps described above in the description of FIGS. 6 and 7. After the laminate sheet 303 is formed (step 1009), an adhesive 315 is applied to the printed surface having ink layer 313 (step 1011). The adhesive applied sheet is then applied to the core component 301 (step 109) to form the laminated article 300 (see FIG. 10).

As shown in FIG. 1, process 100 further includes, after forming the laminate sheet 303, the laminate sheet 303 is applied to the core component 301 (step 109). To apply the laminate sheet 303 to the core component 301, the core component is preferably provided in a cooled condition. For example, if the core component 301 has been extruded, the core component 301 is allowed to cool to a temperature below the extrusion exit temperature. In one embodiment, the core component 301 is allowed to cool to room temperature. In one embodiment, the core component 301 is surface treated on at least the surfaces of the core component that receive the laminate sheet 303. In one embodiment, the surface treatment includes flame treatment, plasma or corona treatment of the core component 301. Subsequent to the surface treatment of the core component 301, one or both of the surfaces that receive the laminate sheet 303 and the second surface 307 of the laminate sheet 303 are applied with an adhesive 315. Suitable adhesives 315 for application to the core component 301 include, but are not limited to, polyurethane adhesive. In other embodiment, the adhesive is a tie layer that provides compatibility between the laminate sheet and the core layer 301. A particularly suitable adhesive includes moisture cured polyurethane adhesives including diphenylmethane-4,4'-diisocyanate, such as KLEIBERIT® adhesive available from Klebchemie M. G. Becker GmbH & Co. Subsequent to the application of the adhesive, the laminate sheet is applied to the applied laminate and rollers provide pressure to secure the laminate to the core component 301 to form the laminated article 300. In one embodiment, the adhesive is a tie layer, such as, but are not limited to, an acrylic polymer film. Suitable printable film materials include copolymers of ethylene and methacrylic acid, such as NUCREL® resin and random ethylene copolymer having monomeric maleic anhydride equivalent, such as FUSABOND® resin. NUCREL® resin and FUSABOND® resin are available from E.I. du Pont de Nemours and Company, Inc. In one embodiment, the environmental conditions are controlled to provide a relative humidity sufficiently high (e.g., greater than about 40% relative humidity) to provide curing of the adhesive. In addition, the temperature of the surface of the core component 301 is preferably sufficiently high (e.g., above room temperature) to provide tack for the adhesive. In another embodiment, when the laminate sheet 303 is applied to the core component 301 (step 109) the laminate sheet 303 is joined to the core component 301 by thermal lamination. Thermal lamination, as utilized herein, includes a thermal joining process wherein, for example, the core component 301 and the laminate sheet 303 are pre-heated to a temperature sufficient to provide fusion of the materials of the laminate sheet 303 to the core component 301. In another embodiment, the core component 301 includes a tie layer or other similar layer, such a polyethylene layer on the laminate sheet 303 facing surface prior to application of the laminate sheet 303 by thermal lamination.

The laminated article 300 is capable of being exposed to outdoor conditions. Outdoor conditions, as utilized herein, include conditions that result from being exposed to weather, pedestrian traffic, equipment loads, and combinations thereof. Outdoor conditions may vary by geographic region and seasonal time periods. The presently disclosed laminated article 300 is capable of being exposed to all such outdoor conditions. In addition, as contemplated herein, outdoor conditions may be provided by actual outdoor conditions or by similar conditions that are not actually outdoors. In other embodiments, outdoor conditions may be provided by providing, simulating or replicating outdoor conditions in an indoor environment. By being capable of being exposed to outdoor conditions, it is meant that the laminated article 300 has the property of resisting or preventing degradation of the visual appearance of the laminated article 300. For example, the laminated article 300 may resist change in visual appearance for a period of at least 5 years, or for a period of at least 10 years, or a period of 15 years, or a period of 20 years, or a period of 25 years, or a period of 30 years, or a period of 40 years.

The articles may be cut, injection molded, compression molded, overmolded, laminated, extruded, milled, or the like, to provide the desired shape and size to produce commercially usable products. The resultant product may have an appearance similar to wood and may be sawed, sanded, shaped, fastened and/or finished in the same manner as natural wood. It may be resistant to rot and decay as well as termite attack and may be used as a replacement for natural wood, for example, as decking, decorative moldings inside or outside of a house, railroad ties, picture frames, furniture, railings, window moldings, window components, door components, roofing systems, sidings, or other types of structural members.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of forming a laminated composite article, comprising:
   providing a core component;
   forming a two-layer wear layer having UV absorbers, the two-layer wear layer includes a first surface and a second surface;
   printing the second surface of the two-layer wear layer with an ink layer to form a printable film;
   embossing the first surface of the two-layer wear layer to provide a slip resistance wear surface;

applying an adhesive to a surface of the printable film to form a laminate sheet; and attaching the laminate sheet to the core component, wherein the UV absorbers are arranged and disposed to provide ink stability to the ink layer.

2. The process of claim 1, wherein providing a core component includes extruding a blend of cellulosic material and a thermoplastic polymeric resin.

3. The process of claim 1, wherein providing a core component includes coextruding a wood polymer composite composition with a polymer composition, wherein the polymeric composition comprises virgin or clean polyethylene material.

4. The process of claim 1, wherein providing a core component includes extruding a polymer component.

5. The process of claim 1, wherein the wear layer comprises an acrylic layer comprising the UV absorbers.

6. The process of claim 5, wherein the wear layer further comprises an additional coating layer disposed on the acrylic layer selected from the group consisting of a polyvinyldine-fluoride-containing layer, a hard coat layer, a rigid acrylic layer, and combinations thereof.

7. The process of claim 6, wherein the additional layer includes at least one of inorganic, organic fillers or nanofillers.

8. The process of claim 1, wherein the wear layer includes a coating layer selected from the group consisting of a polyurethane layer, an ionomer layer, thermoplastic polyurethane layer, and combinations thereof.

9. The process of claim 8, wherein the wear layer further comprises a hard coat layer on the coating layer.

10. The process of claim 9, wherein the hard coat layer includes at least one of inorganic, organic fillers or nanofillers.

11. The process of claim 10, wherein the wear layer further comprises a tie layer between the coating layer and the ink layer.

12. The process of claim 1, wherein the printable film comprises a layer selected from the group consisting acrylic film, polyester film, polyvinyl chloride (PVC) film, thermoplastic polyurethane film, polyethylene (PE) film and combinations thereof.

13. The process of claim 12, wherein printing the second surface of the wear layer with the ink layer includes printing a sublayer background.

14. The process of claim 1, wherein the wear layer is treated by a process selected from the group selected from flame treatment, plasma, corona treatment, and combinations thereof.

15. The process of claim 1, further comprising a tie layer.

16. The process of claim 15, wherein the tie layer is applied by thermal lamination.

17. The process of claim 1, wherein the laminated composite article resists a change in visual appearance for a period of at least 5 years.

* * * * *